United States Patent
Bi et al.

(10) Patent No.: US 11,301,315 B2
(45) Date of Patent: Apr. 12, 2022

(54) AUTOMATED HARDWARE FAILURE PREDICTION FRAMEWORK

(71) Applicant: KYNDRYL, INC., New York, NY (US)

(72) Inventors: Chen Ch Bi, Dalian (CN); Ea-Ee Jan, Ardsley, NY (US); Ye Wy Wang, Beijing (CN); Xiang Zhang, Beijing (CN)

(73) Assignee: Kyndryl, Inc., New York, NY (US)

( * ) Notice: Subject to any disclaimer, the term of this patent is extended or adjusted under 35 U.S.C. 154(b) by 831 days.

(21) Appl. No.: 15/638,478

(22) Filed: Jun. 30, 2017

(65) Prior Publication Data

US 2019/0004891 A1 Jan. 3, 2019

(51) Int. Cl.
*G06N 20/00* (2019.01)
*G06F 11/07* (2006.01)
*G06F 11/30* (2006.01)

(52) U.S. Cl.
CPC ........ *G06F 11/0793* (2013.01); *G06F 11/079* (2013.01); *G06F 11/30* (2013.01); *G06N 20/00* (2019.01); *G06F 11/0766* (2013.01); *G06F 11/302* (2013.01); *G06F 11/3024* (2013.01); *G06F 11/3027* (2013.01); *G06F 11/3034* (2013.01); *G06F 11/3037* (2013.01); *G06F 11/3041* (2013.01); *G06F 11/3072* (2013.01)

(58) Field of Classification Search
CPC .... G06F 11/0793; G06F 11/079; G06F 11/30; G06N 20/00
See application file for complete search history.

(56) References Cited

U.S. PATENT DOCUMENTS

| | | | |
|---|---|---|---|
| 8,214,290 B1 | 7/2012 | Vannatter et al. | |
| 9,081,656 B2 | 7/2015 | Yingling, Jr. et al. | |
| 10,552,002 B1* | 2/2020 | Maclean | G06F 3/0482 |
| 2006/0131381 A1 | 6/2006 | Timmis et al. | |
| 2007/0260568 A1* | 11/2007 | Perng | G06N 5/025 |
| | | | 706/47 |

(Continued)

OTHER PUBLICATIONS

Introduction to Operating Systems (Year: 2011).*

(Continued)

*Primary Examiner* — Kakali Chaki
*Assistant Examiner* — Kevin L. Smith
(74) *Attorney, Agent, or Firm* — Schmeiser, Olsen & Watts; Erik Swanson (57) ABSTRACT

A method and system for improving an automated hardware apparatus failure prediction system is provided. The method includes automatically retrieving operational data associated with operation of a hardware device being monitored for potential failure. Differing time frame software windows associated with observing operational data and hardware device are determined and the operational data is analyzed. In response, an apparatus malfunction prediction software application and a component prediction software application is generated. Features associated with execution of the software applications are generated and a first group of features are added to software code of the apparatus malfunction prediction software application. A second group of features are additionally added to software code of the component prediction software application.

10 Claims, 7 Drawing Sheets

(56) References Cited

U.S. PATENT DOCUMENTS

| | | | |
|---|---|---|---|
| 2009/0316501 A1* | 12/2009 | Bunker | G06F 11/1068 |
| | | | 365/189.17 |
| 2011/0004419 A1 | 1/2011 | Ue et al. | |
| 2013/0208295 A1 | 8/2013 | Bryant et al. | |
| 2014/0281713 A1* | 9/2014 | Hampapur | G06F 11/0751 |
| | | | 714/26 |
| 2016/0210183 A1 | 7/2016 | Hampapur et al. | |
| 2016/0275466 A1 | 9/2016 | Crews et al. | |
| 2016/0350671 A1* | 12/2016 | Morris, II | G05B 23/0229 |

OTHER PUBLICATIONS

U.S. Appl. No. 62/400,451 to Maclean et al. (Year: 2016).*
Bousdekis et al., "A Proactive Decision Making Framework for Condition-Based Maintenance," National Technical University of Athens (2016) (Year: 2016).*
Hack-Eun Kim, "Machine Prognositcs based on Health State Probability Estimation," Queensland University (Thesis, 2010) (Year: 2010).*
Chi et al., "Defect Analysis and Prediction by Applying the Multistage Software Reliability Growth Model", IEEE (Mar. 13, 2017) (Year: 2017).*
Pernici et al., "Automatic Learning of Repair Strategies for Web Services," 5th European Conference on Web Services (IEEE 2007) (Year: 2007).*
Mell, Peter et al.; "The NIST Definition of Cloud Computing;" National Institute of Standards and Technology; Special Publication 800-145; Sep. 2011; 7 pages.

* cited by examiner

AUTOMATED HARDWARE FAILURE PREDICTION FRAMEWORK

FIELD

The present invention relates generally to a method for predicting hardware device failure and in particular to a method and associated system for improving hardware device failure predictions with respect to determining specified hardware device component failures.

BACKGROUND

Accurately determining equipment failure typically includes an inaccurate process with little flexibility. Determining specified causes for the equipment failure may include a complicated process that may be time consuming and require a large amount of resources. Typical processes include the use of multiple models, each model used to determine a specified component failure. Accordingly, there exists a need in the art to overcome at least some of the deficiencies and limitations described herein above.

SUMMARY

A first aspect of the invention provides an automated hardware apparatus failure prediction improvement method comprising: automatically retrieving, by a processor of a machine learning hardware device, operational data associated with operation of a hardware device being monitored for potential failure; determining, by the processor, differing time frame observation software windows associated with observing the operational data and the hardware device; analyzing, by the processor, the operational data with respect to the differing time frame observation windows; generating, by the processor based on results of the analyzing, an apparatus malfunction prediction software application for predicting a hardware or software malfunction of the hardware device; generating, by the processor based on the apparatus malfunction prediction software application, a component prediction software application for predicting a malfunction of specified components of the hardware device based on the hardware or software malfunction of the hardware device; generating, by the processor based on the operational data and the hardware device viewable within the software windows, features associated with execution of the apparatus malfunction prediction software application and the component prediction software application; adding, by the processor, a first group of features of the features to software code of the apparatus malfunction prediction software application resulting in generation of a modified apparatus malfunction prediction software application; and adding, by the processor, a second group of features of the features to software code of the component prediction software application resulting in generation of a modified component prediction software application, wherein the first group of features differs from the second group of features.

A second aspect of the invention provides a computer program product, comprising a computer readable hardware storage device storing a computer readable program code, the computer readable program code comprising an algorithm that when executed by a processor of a machine learning hardware device implements an automated hardware apparatus failure prediction improvement method, the method comprising: automatically retrieving, by the processor, operational data associated with operation of a hardware device being monitored for potential failure; determining, by the processor, differing time frame observation software windows associated with observing the operational data and the hardware device; analyzing, by the processor, the operational data with respect to the differing time frame observation software windows; generating, by the processor based on results of the analyzing, an apparatus malfunction prediction software application for predicting a hardware or software malfunction of the hardware device; generating, by the processor based on the apparatus malfunction prediction software application, a component prediction software application for predicting a malfunction of specified components of the hardware device based on the hardware or software malfunction of the hardware device; generating, by the processor based on the operational data and the hardware device viewable within the software windows, features associated with execution of the apparatus malfunction prediction software application and the component prediction software application; adding, by the processor, a first group of features of the features to software code of the apparatus malfunction prediction software application resulting in generation of a modified apparatus malfunction prediction software application; and adding, by the processor, a second group of features of the features to software code of the component prediction software application resulting in generation of a modified component prediction software application, wherein the first group of features differs from the second group of features.

A third aspect of the invention provides a machine learning hardware device comprising a processor coupled to a computer-readable memory unit, the memory unit comprising instructions that when executed by the computer processor implements an automated hardware apparatus failure prediction improvement method comprising: automatically retrieving, by the processor, operational data associated with operation of a hardware device being monitored for potential failure; determining, by the processor, differing time frame observation graphical user interface (software) windows associated with observing the operational data and the hardware device; analyzing, by the processor, the operational data with respect to the differing time frame observation software windows; generating, by the processor based on results of the analyzing, an apparatus malfunction prediction software application for predicting a hardware or software malfunction of the hardware device; generating, by the processor based on the apparatus malfunction prediction software application, a component prediction software application for predicting a malfunction of specified components of the hardware device based on the hardware or software malfunction of the hardware device; generating, by the processor based on the operational data and the hardware device viewable within the software windows, features associated with execution of the apparatus malfunction prediction software application and the component prediction software application; adding, by the processor, a first group of features of the features to software code of the apparatus malfunction prediction software application resulting in generation of a modified apparatus malfunction prediction software application; and adding, by the processor, a second group of features of the features to software code of the component prediction software application resulting in generation of a modified component prediction software application, wherein the first group of features differs from the second group of features.

The present invention advantageously provides a simple method and associated system capable of accurately determining equipment failure.

DETAILED DESCRIPTION

Figure 1:
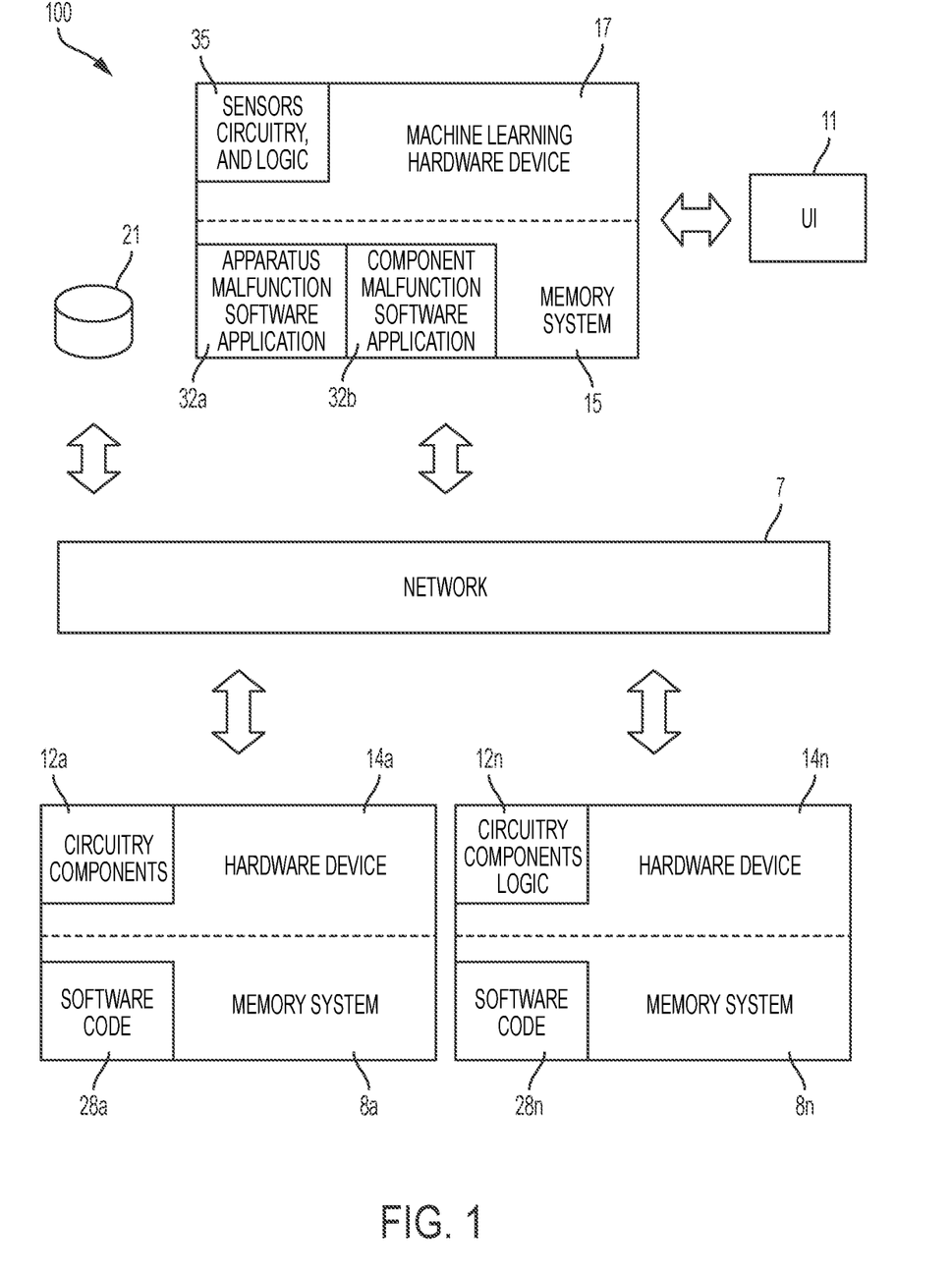
FIG. 1 illustrates a system for improving hardware and software diagnostic technology associated with failure predictions, in accordance with embodiments of the present invention.

FIG. 1 illustrates a system 100 for improving hardware and software diagnostic technology associated with failure predictions, in accordance with embodiments of the present invention. System 100 is enabled to execute a machine learning framework to predict and classify hardware or software failures based on retrieved sensor data, usage data, prior failure data, and specified machine configurations for providing predictive maintenance solutions for hardware devices (e.g., an automated teller machine (ATM)). System 100 enables a first model and associated software application (e.g., apparatus malfunction software application 32a) for predicting a hardware failure such that a second model and associated software application (e.g., component malfunction software application 32b) is enabled to predict specified component failure. Data (including sensor based error logs, service and failure records, hardware usage data, hardware performance data and machine configuration, and vendor name and model number) is retrieved for input to the first and second model. Additionally, three software windows (e.g., a graphical user interface (GUI) window, configuration file windows, command parameter windows, etc.) of the machine learning framework as generated and executed as follows:

1. An observation windows for interacting with historical error logs, failure records, and transaction records.
2. A prediction window interacting with for failure prediction software.
3. A transition window to enable resource placement.

System 100 of FIG. 1 includes a machine learning hardware device 17 (or hardware system) and a database system 21 connected through a network 7 to a hardware device 14a and a hardware device 14n (e.g., requiring repair or maintenance). Hardware device 14a ... 14n may comprise any number of hardware devices for predictions requiring repair or maintenance. Additionally, machine learning hardware device 17 is connected or integrated with a user interface (UI) 11. Machine learning hardware device 17 comprises sensors, circuitry, and logic 35 and a (specialized) memory system 15. Memory system 15 comprises an apparatus malfunction detection software application (and model) 32a and a component malfunction detection software application (and model) 32b. Memory system 15 may include a single memory system. Alternatively, memory system 15 may include a plurality of memory systems. Hardware device 14a comprises connection circuitry/components 12a and a (specialized) memory system 8a. Memory system 8a comprises software code 28a. Memory system 8a may include a single memory system. Alternatively, memory system 8a may include a plurality of memory systems. Hardware device 14n comprises circuitry/components 12n and a (specialized) memory system 8n. Memory system 8n comprises software code 28n. Memory system 8n may include a single memory system. Alternatively, memory system 8n may include a plurality of memory systems. Machine learning hardware device 17 and hardware devices 14a ... 14n each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment machine learning hardware device 17 and hardware devices 14a ... 14n may each comprise a specialized hardware device comprising specialized (non-generic) hardware and circuitry (i.e., specialized discrete non-generic analog, digital, and logic based circuitry) for (independently or in combination) executing a process described with respect to FIGS. 1-7. The specialized discrete non-generic analog, digital, and logic based circuitry (e.g., sensors, circuitry, and logic 35 and circuitry/components 12 ... 12n, etc.) may include proprietary specially designed components (e.g., a specialized integrated circuit, such as for example an Application Specific Integrated Circuit (ASIC) designed for only implementing an automated process for improving hardware and software diagnostic technology associated with hardware and failure predictions Network 7 may include any type of network including, inter alia, a local area network, (LAN), a wide area network (WAN), the Internet, a wireless network, etc.

System 100 enables comprises a multistage classification framework enabled to predict hardware failure. The framework generates and executes two differing classification software applications and models. A first model predicts hardware or software system failure and a subsequent second model is generated and executed to determine a specified component (of the hardware or software system) failure. The multiple model implemented prediction method (executed by system 100 of FIG. 1) improves failure prediction performance technology thereby reducing software and model developmental resources. The multistage classification framework utilizes the three differing software windows for enabling the predictions as described, supra. Differing feature extraction and engineering techniques may be leveraged or developed to improve the software and associated models. For example, differing classification algorithms may be applied such as, inter alia, a logistic regression algorithm, a support vector machine algorithm, a random forest algorithm, a gradient boost machine algorithm, XGBoost algorithm, a bagging algorithm, a boosting algorithm, etc.

System 100 generates and enables improved software and model development with respect to reducing software components necessary for implementing a process for predicting and diagnosing hardware and software malfunctions of a hardware device. Additionally, system 100 generates and enables improved software and model development with respect to reducing software components necessary for implementing a process for predicting and diagnosing hardware and software malfunctions of specified components of a malfunctioning hardware device thereby increasing a speed and efficiency of diagnosis. System 100 executes the following training and prediction processes:

The following steps illustrate an embodiment of the training process:
1. A data acquisition process is executed resulting in retrieval of sensor data, machine usage data, periodical (e.g., weekly, monthly, etc.) machine availability data, machine configuration data, machine service record data, past repair event data. Sensor data may include, inter alia, time stamped error and warning messages, a machine status from each machine, etc. Machine usage data may include, inter alia, functionality data, transactional data, etc. Machine configuration data may include, inter alia, a machine manufacture, a machine model type, a machine model number, a machine hardware and software configuration, etc. Machine service record data may include time stamped service records including, inter alia, incident ticket open time, affected component, repair notes, failure categories, parts, hours for repairs, technician traveling time, etc.
2. Observation windows, transition windows, and prediction windows (i.e., with respect to software) are generated. For example, an observation window may be associated with a 30 day window, a transition window may be associated with a 7 day window, and a prediction window may be associated with a 28 day window.
3. Two training software application and associated models are generated. A first training software application and associated model for predicting device failure is generated and a second software application and associated model for predicting component failure for a device is generated. The first training software application and associated model is enabled to predict if a given device will fail within a prediction window. The second training software application and associated model is enabled to predict a specified component failure when the device has been predicted to fail.
4. A feature engineering process is executed with respect to the first training software application and associated model and the second software application and associated model. The feature engineering process is used to create features (i.e., 2 sets of features for device failure predictions and component failure predictions) using data within the observation window. Features may include: a number of error and warning messages or service records from a subsection of an observation window (e.g., 7 days, 14 days, 28 days, etc.), a number of selective pattern of error and warning messages from the subsection of the observation window (e.g., a pattern may comprise an error 123 followed by an error 125 followed by an error 321), encoding for category variable (e.g., one-hot encoding for various machine type and model), higher order features (e.g., a join feature of error code 123 and 456, a non-linear feature, RBF features (Gaussian kernel features), etc.), usage and availability values from a subsection of the observation window, etc.
5. Features are selected and transformed to improve prediction and diagnosis performance. A feature transformation process may include a PCA process, an RBF process, etc. A feature selection process may include a forward process, a backward process, a gnni index process, a correlation feature process, etc.
6. A classification algorithm is executed such that a device failure model and component model comprise a training base with respect to its own feature and classification algorithm. The following classification algorithms may be executed: SVM, neuron network, logistic regression, random forest, GBM (gradient boost machine), XGboot, bagging and voting and model aggregation, etc. Additionally, a model aggregation algorithm may be integrated to future runs to improve software application and model performance.

The following steps illustrate an embodiment of the prediction process:
1. A prediction period (e.g., future date) is generated and observation windows are derived.
2. Necessary data is collected within the observation windows.
3. Features are generated for the first training software application and associated model and the second training software application and associated model.
4. The features are filtered and transformed based on results of step 5 of the training process.
5. A device failure prediction is generated with respect to a specified prediction window.
6. A specified component failure prediction (for the device predicted to fail) is generated. Results of the predictions are refined and presented to a user.

Figure 2:
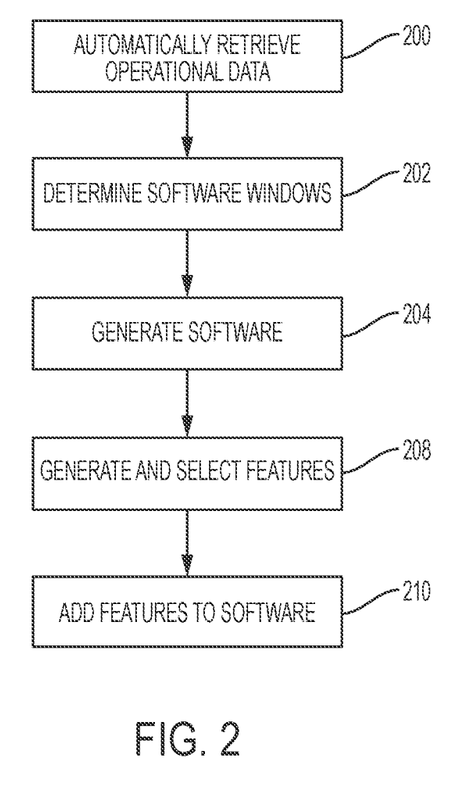
FIG. 2 illustrates an algorithm detailing a process flow enabled by the system of FIG. 1 for generating an apparatus malfunction software application and component malfunction software application for predicting a hardware failure, in accordance with embodiments of the present invention.

FIG. 2 illustrates an algorithm detailing a process flow enabled by system 100 of FIG. 1 for generating apparatus malfunction software application 32a (and associated model of FIG. 1) and component malfunction software application 32b (and associated model of FIG. 1) for predicting a hardware failure, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by machine learning hardware device 17, hardware device 14a, and hardware device 14b of FIG. 1. In step 200, operational data is retrieved (statically or in real time by machine learning hardware device 17 of FIG. 1). The operational data is associated with operation of a hardware device (e.g., hardware device 14a and/or 14b of FIG. 1) being monitored for potential failure. The operational data may include sensor data (retrieved from device monitoring sensors such as, inter alia, an optical sensor, a temperature sensor, a radio frequency identification (RFID) sensor, a voltage sensor, etc.) associated with operation and usage of the hardware device, past hardware performance and failure data associated with the hardware device, data describing a configuration of the hardware device, periodic availability data associated with the hardware device, etc. In step 202, differing time frame software windows associated with observing the operational data and the hardware device are generated and determined. Additionally, the operational data is analyzed with respect to the differing time frame observation software windows. The differing time frame observation software windows may include:
1. A first time frame observation window for presenting historical error logs, failure records, and transactional records for the hardware device.
2. A second time frame prediction window for presenting predictions associated with the hardware or software malfunction of the hardware device and possible failure of a group of electrical/mechanical components.

3. A third time frame transition window for presenting repair based timeframes for repairing the hardware device.

In step 204, an apparatus malfunction prediction software application is generated based on results of step 202. The apparatus malfunction prediction software application is configured for predicting a hardware or software malfunction of the hardware device. Additionally, a component prediction software application is generated based on the apparatus malfunction prediction software application. The component malfunction prediction software application is configured for predicting a malfunction of specified components of the hardware device based on the determined hardware or software malfunction of the hardware device. In step 208, features associated with execution of the apparatus malfunction prediction software application and the component prediction software application are generated and selected based on the operational data and the hardware device viewable within the software windows. A first group of features is selected for the apparatus malfunction prediction software application and a second group of features is selected for the component prediction software application. The first group of features and the second group of features may comprise the same or differing features. The features may include: error and warning messages associated with past malfunctions of the hardware device, a selective pattern of said error and warning messages retrieved from the differing time frame observation software windows, encoding data associated with machine information of the hardware device, high order features of the hardware device, and usage and availability values retrieved from the differing time frame observation software windows. In step 210, the first group of features (of the features of step 208) is added to software code of the apparatus malfunction prediction software application resulting in generation of a modified apparatus malfunction prediction software application. Additionally, the second group of differing features (of the features of step 208) is added to software code of the component prediction software application resulting in generation of a modified component prediction software application.

Figure 3:
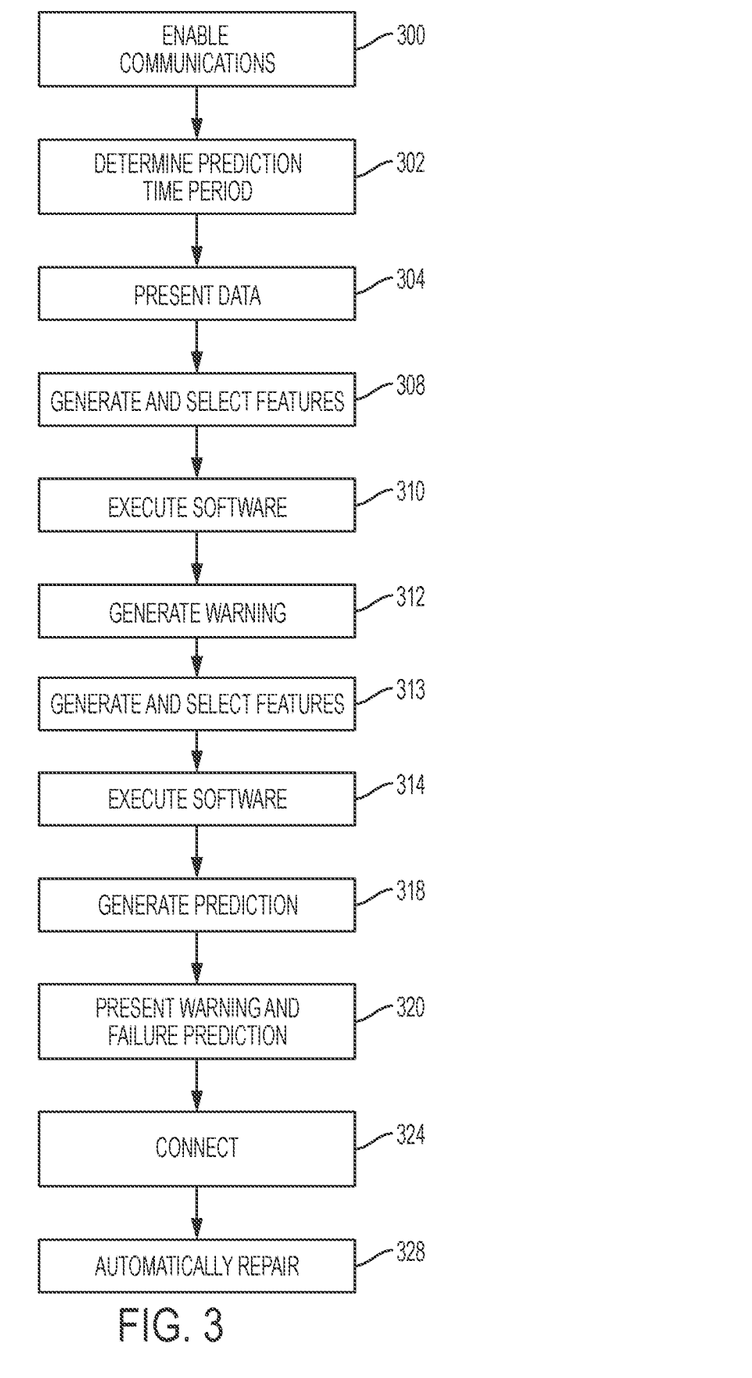
FIG. 3 illustrates an algorithm detailing a process flow enabled by the system of FIG. 1 for executing an apparatus malfunction software application and component malfunction software application for predicting a hardware failure, in accordance with embodiments of the present invention.

FIG. 3 illustrates an algorithm detailing a process flow enabled by system 100 of FIG. 1 for executing apparatus malfunction software application 32a (and associated model of FIG. 1) and component malfunction software application 32b (and associated model of FIG. 1) for predicting a specified hardware component failure, in accordance with embodiments of the present invention. Each of the steps in the algorithm of FIG. 3 may be enabled and executed in any order by a computer processor(s) executing computer code. Additionally, each of the steps in the algorithm of FIG. 3 may be enabled and executed in combination by machine learning hardware device 17, hardware device 14a, and hardware device 14b of FIG. 1. In step 300, communications between the machine learning hardware device and the hardware device (being predicted to malfunction) are enabled. In step 302, a specified prediction time period and an associated time frame observation software window of the generated (in step 202 of FIG. 2) time frame observation software window are determined. In step 304, associated data of operational data (e.g., of step 200 of FIG. 2) is presented within an associated time frame observation software window. In step 308, first specified features associated with the first group of features (of step 208 of FIG. 2) are generated and selected. In step 310, the modified apparatus malfunction prediction software application (of step 210 of FIG. 2) is executed with respect to the associated data and the first group of specified features. In step 312, a warning indicating a prediction associated with a hardware or software malfunction of the hardware device is generated in response to step 310. In step 313, second specified features associated with the second group of features (of step 208 of FIG. 2) are generated and selected. In step 314, the modified component prediction software application (of step 210 of FIG. 2) is executed (in response to the warning) with respect to the associated data, the second group of specified features, and the hardware or software malfunction of the hardware device. In step 318, prediction data is generated. The prediction data indicates a group of electrical/mechanical components of the hardware device that may be causing the hardware or software malfunction of the hardware device. In step 320, the warning and data indicating possible failure of the group of electrical/mechanical components are presented to a user (via software) with respect the associated time frame observation software window. In step 324, the hardware device is automatically connected to a repair based hardware system based on the warning and the data indicating possible failure of the group of electrical/mechanical components. In step 328, the repair based hardware system automatically repairs the group of electrical/mechanical components. The process for automatically repairing the group of electrical/mechanical components may include: repairing hardware based problems with the hardware device or repairing software based problems with the hardware device.

Figure 4:
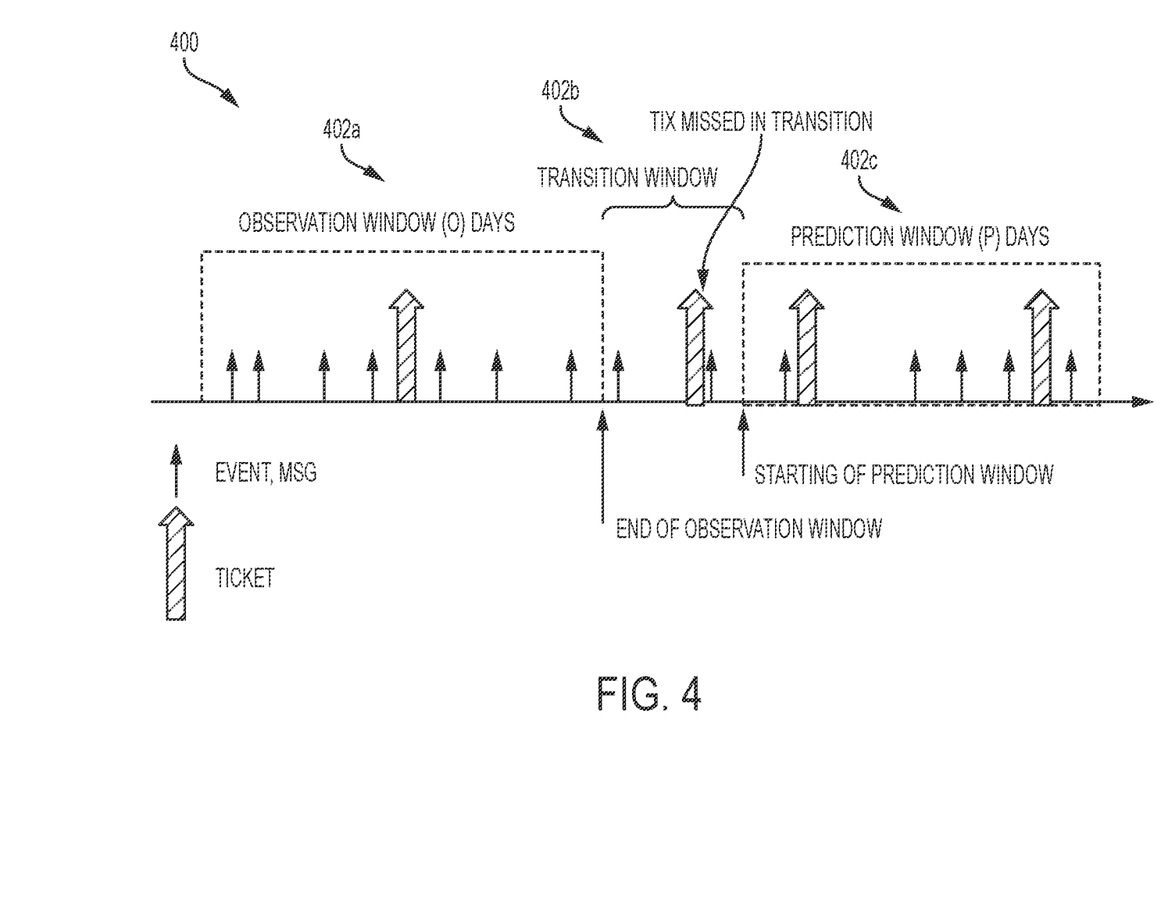
FIG. 4 illustrates a graphical representation associated with the system of FIG. 1 for presenting differing time frame observation windows, in accordance with embodiments of the present invention.

FIG. 4 illustrates a graphical representation 400 for presenting the differing time frame observation windows of FIGS. 1-3, in accordance with embodiments of the present invention. Graphical representation 400 of FIG. 4 includes an observation window 402a, a transition window 402b, and a prediction window 402c. Graphical representation 400 of FIG. 4 illustrates the interface between the observation window 402a, the transition window 402b, and the prediction window 402c. Graphical representation 400 is enabled to predict future repairs within prediction windows and uses events, messages, and historical tickets for analysis. Additionally, error messages retrieved from sensors are presented via graphical representation 400. Graphical representation 400 may be presented by system 100 via UI 11 of FIG. 1.

Figure 5:
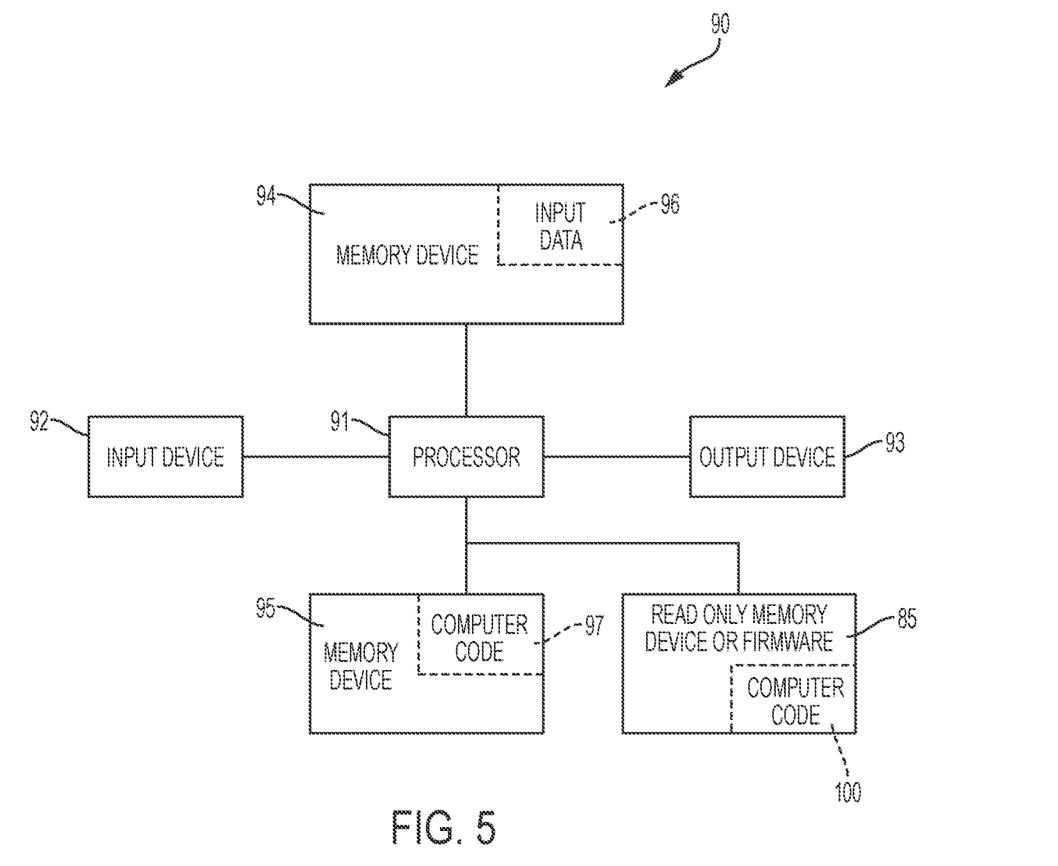
FIG. 5 illustrates a computer system used by the system of FIG. 1 for enabling a process for improving hardware and software diagnostic technology associated with failure predictions, in accordance with embodiments of the present invention.

FIG. 5 illustrates a computer system 90 (e.g., hardware device 17, hardware device 14a, and hardware device 14b of FIG. 1) used by or comprised by the system of FIG. 1 for improving hardware and software diagnostic technology associated with failure predictions, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 3) for improving hardware and software diagnostic technology associated with failure predictions. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIGS. 2 and 3) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve hardware and software diagnostic technology associated with failure predictions. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving hardware and software diagnostic technology associated with failure predictions. In another embodiment, the invention provides a business method that performs the process steps of the invention on a subscription, advertising, and/or fee basis. That is, a service supplier, such as a Solution Integrator, could offer to enable a process for improving hardware and software diagnostic technology associated with failure predictions. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment (e.g., Internet of thing (IOT)) now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
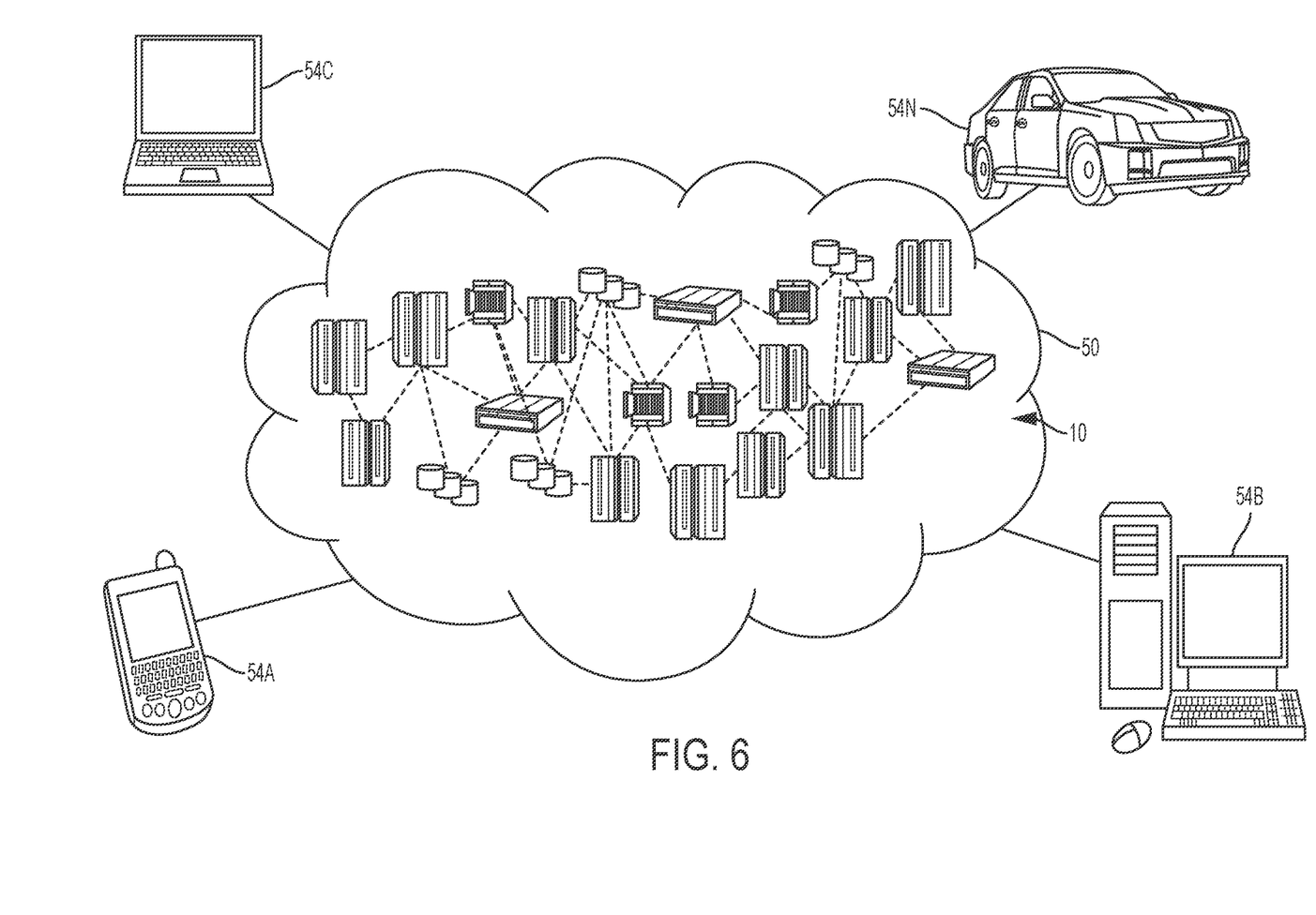
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
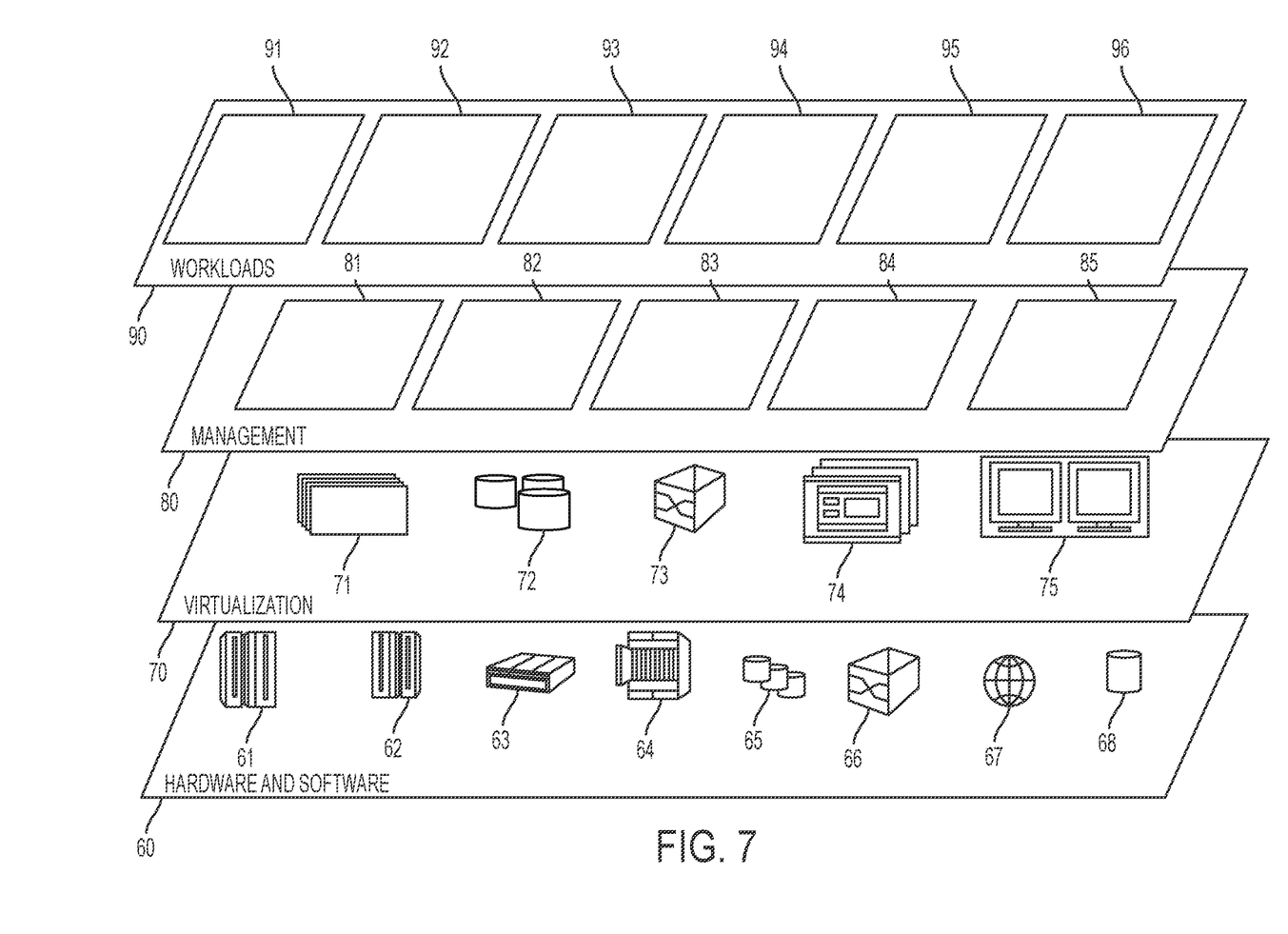
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving hardware and software diagnostic technology associated with failure predictions 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated hardware apparatus failure prediction improvement method comprising:

monitoring, by a processor of a machine learning hardware device via a plurality of sensors, operation and usage of a hardware device enabling detection of potential failure of said hardware device, wherein said plurality of sensors comprise optical sensors, temperature sensors, RFID sensors, and voltage sensors;

automatically retrieving, by said processor, operational data associated with the operation and usage of the hardware device enabling detection of said potential failure of said hardware device, wherein said operational data comprises sensor data, machine usage data, periodical machine availability data, machine configuration data, machine service record data, and past repair event data of said hardware device, wherein said sensor data is retrieved from said plurality of sensors, wherein said sensor data comprises time stamped error and warning messages and a machine status from said hardware device, wherein said machine usage data comprises device functionality data and transactional data, wherein said machine configuration data comprises a machine manufacture of said hardware device, a machine model type of said hardware device, a machine model number of said hardware device, and a machine hardware and software configuration of said hardware device;

determining and presenting, by said processor, differing time frame observation software windows associated with observing said operational data and said hardware device, wherein said differing time frame observation software windows comprise:

a first time frame observation window presenting historical error logs failure records, and transactional records for said hardware device;
a second time frame prediction window presenting predictions associated with said hardware/software malfunction of said hardware device and said possible failure of said group of electrical or mechanical components; and
a third time frame transition window presenting repair based timeframes for repairing said hardware device;
analyzing, by said processor, said operational data with respect to said differing time frame observation software windows;
generating, by said processor based on results of said analyzing, an apparatus malfunction prediction software application and a first model;
reducing, by said processor, software components of said apparatus malfunction prediction software application;
first predicting and diagnosing, by said processor in response to execution of said apparatus malfunction prediction software application and said first model, a hardware or software malfunction of said hardware device;
generating, by said processor subsequent to said generating said first model and said first predicting and diagnosing and based on said apparatus malfunction prediction software application, a component prediction software application and a second model;
second predicting and diagnosing, by said processor in response to execution of said component prediction software application and said second model, a hardware or software malfunction of specified components of said hardware device based on said hardware or software malfunction of said hardware device;
generating, by said processor in response to said operational data and said hardware device viewable within said time frame observation software windows, features causing said execution of said apparatus malfunction prediction software application and said component prediction software application, wherein said features comprise a number of error and warning messages from a subsection of an observation window of said time frame observation software windows, a number of selective pattern of error and warning messages from said subsection of said observation window, encoding for a device category variable, higher order features of error codes associated with said hardware device, a non-linear feature, Gaussian kernel features, and usage and availability values from said subsection of said observation window;
adding, by said processor, a first group of features of said features to software code of said apparatus malfunction prediction software application resulting in generation of a modified apparatus malfunction prediction software application;
adding, by said processor, a second group of features of said features to software code of said component prediction software application resulting in generation of a modified component prediction software application, wherein said first group of features differs from said second group of features;
enabling, by said processor, communications between said machine learning hardware device and said hardware device;
determining, by said processor in response to said enabling, a specified prediction time period and an associated time frame observation software window of said time frame observation software windows;
presenting, by said processor within said associated time frame observation software window, associated data of said operational data;
selecting, by said processor, first specified features associated from said first group of features;
first executing, by said processor, said modified apparatus malfunction prediction software application with respect to said associated data and said first specified features;
first generating, by said processor in response to said first executing, a warning indicating a prediction associated with said hardware or software malfunction of said hardware device;
selecting, by said processor, second specified features associated from said second group of features;
second executing, by said processor in response to said warning, said modified component prediction software application with respect to said associated data, said second specified features, and said hardware or software malfunction of said hardware device;
second generating, by said processor, prediction data indicating a group of electrical/mechanical components of said specified components of said hardware device that may be causing said hardware or software malfunction of said hardware device;
increasing, by said processor, a speed and efficiency of said predicting and diagnosing said hardware or software malfunction of said hardware device and said predicting and diagnosing said malfunction of said specified components of said hardware device;
presenting, by said processor to a user, said warning and data indicating possible failure of said group of electrical/mechanical components with respect said associated time frame observation software window;
automatically connecting via connection circuitry and switches, by said processor based on results of first generating and said second generating, said hardware device to a repair based hardware system; and
automatically repairing, by said repair based hardware system, said group of electrical/mechanical components, wherein said automatically repairing said group of electrical/mechanical components comprises:
repairing circuitry and logic based problems with said hardware device; and
repairing software based issues of said hardware device.

2. The method of claim 1, wherein said automatically repairing comprises repairing hardware based problems with said hardware device.

3. The method of claim 1, wherein said operational data comprises sensor data associated with operation and usage of said hardware device, past hardware performance and failure data associated with said hardware device, data describing a configuration of said hardware device, and periodic availability data associated with said hardware device.

4. The method of claim 1, wherein said automatically retrieving is performed in real time.

5. The method of claim 1, wherein said features comprise error and warning messages associated with past malfunctions of said hardware device, a selective pattern of said error and warning messages retrieved from said differing time frame observation software windows, encoding data associated with machine information of said hardware device, high order features of said hardware device, and usage and availability values retrieved from said differing time frame observation software windows.

6. The method of claim 1, further comprising:
providing at least one support service for at least one of creating, integrating, hosting, maintaining, and deploying computer-readable code in the control hardware, said code being executed by the computer processor to implement: said automatically retrieving, said determining, said analyzing, said generating said apparatus malfunction prediction software application, said generating said component prediction software application, said generating said features, said adding said first group of features, and said adding said second group of features.

7. A computer program product, comprising a non-transitory computer readable hardware storage device storing a computer readable program code, said computer readable program code comprising an algorithm that when executed by a processor of a machine learning hardware device implements an automated hardware apparatus failure prediction improvement method, said method comprising:

monitoring, by said processor via a plurality of sensors, operation and usage of a hardware device enabling detection of potential failure of said hardware device, wherein said plurality of sensors comprise optical sensors, temperature sensors, RFID sensors, and voltage sensors;

automatically retrieving, by said processor, operational data associated with the operation and usage of the hardware device enabling detection of said potential failure of said hardware device, wherein said operational data comprises sensor data, machine usage data, periodical machine availability data, machine configuration data, machine service record data, and past repair event data of said hardware device, wherein said sensor data is retrieved from said plurality of sensors, wherein said sensor data comprises time stamped error and warning messages and a machine status from said hardware device, wherein said machine usage data comprises device functionality data and transactional data, wherein said machine configuration data comprises a machine manufacture of said hardware device, a machine model type of said hardware device, a machine model number of said hardware device, and a machine hardware and software configuration of said hardware device;

determining and presenting, by said processor, differing time frame observation software windows associated with observing said operational data and said hardware device, wherein said differing time frame observation software windows comprise:
a first time frame observation window presenting historical error logs failure records, and transactional records for said hardware device;
a second time frame prediction window presenting predictions associated with said hardware/software malfunction of said hardware device and said possible failure of said group of electrical or mechanical components; and
a third time frame transition window presenting repair based timeframes for repairing said hardware device;

analyzing, by said processor, said operational data with respect to said differing time frame observation software windows;

generating, by said processor based on results of said analyzing, an apparatus malfunction prediction software application and a first model;

reducing, by said processor, software components of said apparatus malfunction prediction software application;

first predicting and diagnosing, by said processor in response to execution of said apparatus malfunction prediction software application and said first model, a hardware or software malfunction of said hardware device;

generating, by said processor subsequent to said generating said first model and said first predicting and diagnosing and based on said apparatus malfunction prediction software application, a component prediction software application and a second model;

second predicting and diagnosing, by said processor in response to execution of said component prediction software application and said second model, a hardware or software malfunction of specified components of said hardware device based on said hardware or software malfunction of said hardware device;

generating, by said processor in response to said operational data and said hardware device viewable within said time frame observation software windows, features causing said execution of said apparatus malfunction prediction software application and said component prediction software application, wherein said features comprise a number of error and warning messages from a subsection of an observation window of said time frame observation software windows, a number of selective pattern of error and warning messages from said subsection of said observation window, encoding for a device category variable, higher order features of error codes associated with said hardware device, a non-linear feature, Gaussian kernel features, and usage and availability values from said subsection of said observation window;

adding, by said processor, a first group of features of said features to software code of said apparatus malfunction prediction software application resulting in generation of a modified apparatus malfunction prediction software application;

adding, by said processor, a second group of features of said features to software code of said component prediction software application resulting in generation of a modified component prediction software application, wherein said first group of features differs from said second group of features;

enabling, by said processor, communications between said machine learning hardware device and said hardware device;

determining, by said processor in response to said enabling, a specified prediction time period and an associated time frame observation software window of said time frame observation software windows;

presenting, by said processor within said associated time frame observation software window, associated data of said operational data;

selecting, by said processor, first specified features associated from said first group of features;

first executing, by said processor, said modified apparatus malfunction prediction software application with respect to said associated data and said first specified features;

first generating, by said processor in response to said first executing, a warning indicating a prediction associated with said hardware or software malfunction of said hardware device;

selecting, by said processor, second specified features associated from said second group of features;

second executing, by said processor in response to said warning, said modified component prediction software application with respect to said associated data, said second specified features, and said hardware or software malfunction of said hardware device;
second generating, by said processor, prediction data indicating a group of electrical/mechanical components of said specified components of said hardware device that may be causing said hardware or software malfunction of said hardware device;
increasing, by said processor, a speed and efficiency of said predicting and diagnosing said hardware or software malfunction of said hardware device and said predicting and diagnosing said malfunction of said specified components of said hardware device;
presenting, by said processor to a user, said warning and data indicating possible failure of said group of electrical/mechanical components with respect said associated time frame observation software window;
automatically connecting via connection circuitry and switches, by said processor based on results of first generating and said second generating, said hardware device to a repair based hardware system; and
automatically repairing, by said repair based hardware system, said group of electrical/mechanical components, wherein said automatically repairing said group of electrical/mechanical components comprises:
repairing circuitry and logic based problems with said hardware device; and
repairing software based issues of said hardware device.

8. The computer program product of claim 7, wherein said automatically repairing comprises repairing hardware based problems with said hardware device.

9. A machine learning hardware device comprising a processor coupled to a computer-readable memory unit, said memory unit comprising instructions that when executed by the computer processor implements an automated hardware apparatus failure prediction improvement method comprising:
monitoring, by said processor via a plurality of sensors, operation and usage of a hardware device enabling detection of potential failure of said hardware device, wherein said plurality of sensors comprise optical sensors, temperature sensors, RFID sensors, and voltage sensors;
automatically retrieving, by said processor, operational data associated with the operation and usage of the hardware device enabling detection of said potential failure of said hardware device, wherein said operational data comprises sensor data, machine usage data, periodical machine availability data, machine configuration data, machine service record data, and past repair event data of said hardware device, wherein said sensor data is retrieved from said plurality of sensors, wherein said sensor data comprises time stamped error and warning messages and a machine status from said hardware device, wherein said machine usage data comprises device functionality data and transactional data, wherein said machine configuration data comprises a machine manufacture of said hardware device, a machine model type of said hardware device, a machine model number of said hardware device, and a machine hardware and software configuration of said hardware device;
determining and presenting, by said processor, differing time frame observation software windows associated with observing said operational data and said hardware device, wherein said differing time frame observation software windows comprise:
a first time frame observation window presenting historical error logs failure records, and transactional records for said hardware device;
a second time frame prediction window presenting predictions associated with said hardware/software malfunction of said hardware device and said possible failure of said group of electrical or mechanical components; and
a third time frame transition window presenting repair based timeframes for repairing said hardware device;
analyzing, by said processor, said operational data with respect to said differing time frame observation software windows;
generating, by said processor based on results of said analyzing, an apparatus malfunction prediction software application and a first model;
reducing, by said processor, software components of said apparatus malfunction prediction software application;
first predicting and diagnosing, by said processor in response to execution of said apparatus malfunction prediction software application and said first model, a hardware or software malfunction of said hardware device;
generating, by said processor subsequent to said generating said first model and said first predicting and diagnosing and based on said apparatus malfunction prediction software application, a component prediction software application and a second model;
second predicting and diagnosing, by said processor in response to execution of said component prediction software application and said second model, a hardware or software malfunction of specified components of said hardware device based on said hardware or software malfunction of said hardware device;
generating, by said processor in response to said operational data and said hardware device viewable within said time frame observation software windows, features causing said execution of said apparatus malfunction prediction software application and said component prediction software application, wherein said features comprise a number of error and warning messages from a subsection of an observation window of said time frame observation software windows, a number of selective pattern of error and warning messages from said subsection of said observation window, encoding for a device category variable, higher order features of error codes associated with said hardware device, a non-linear feature, Gaussian kernel features, and usage and availability values from said subsection of said observation window;
adding, by said processor, a first group of features of said features to software code of said apparatus malfunction prediction software application resulting in generation of a modified apparatus malfunction prediction software application;
adding, by said processor, a second group of features of said features to software code of said component prediction software application resulting in generation of a modified component prediction software application, wherein said first group of features differs from said second group of features;
enabling, by said processor, communications between said machine learning hardware device and said hardware device;

determining, by said processor in response to said enabling, a specified prediction time period and an associated time frame observation software window of said time frame observation software windows;

presenting, by said processor within said associated time frame observation software window, associated data of said operational data;

selecting, by said processor, first specified features associated from said first group of features;

first executing, by said processor, said modified apparatus malfunction prediction software application with respect to said associated data and said first specified features;

first generating, by said processor in response to said first executing, a warning indicating a prediction associated with said hardware or software malfunction of said hardware device;

selecting, by said processor, second specified features associated from said second group of features;

second executing, by said processor in response to said warning, said modified component prediction software application with respect to said associated data, said second specified features, and said hardware or software malfunction of said hardware device;

second generating, by said processor, prediction data indicating a group of electrical/mechanical components of said specified components of said hardware device that may be causing said hardware or software malfunction of said hardware device;

increasing, by said processor, a speed and efficiency of said predicting and diagnosing said hardware or software malfunction of said hardware device and said predicting and diagnosing said malfunction of said specified components of said hardware device;

presenting, by said processor to a user, said warning and data indicating possible failure of said group of electrical/mechanical components with respect said associated time frame observation software window;

automatically connecting via connection circuitry and switches, by said processor based on results of first generating and said second generating, said hardware device to a repair based hardware system; and automatically repairing, by said repair based hardware system, said group of electrical/mechanical components, wherein said automatically repairing said group of electrical/mechanical components comprises:

repairing circuitry and logic based problems with said hardware device; and repairing software based issues of said hardware device.

10. The method of claim 1, wherein said hardware device comprises an automated teller machine (ATM).

* * * * *